US012671498B2

(12) United States Patent　　　　(10) Patent No.:　US 12,671,498 B2
Horikoshi et al.　　　　　　　　　　　(45) Date of Patent:　　Jun. 30, 2026

(54) OPTICAL RECEIVING APPARATUS AND OPTICAL RECEIVING METHOD USING CHANGING COEFFICIENT VALUES FOR FAST FOURIER TRANSFORM

(71) Applicant: NTT, Inc., Tokyo (JP)

(72) Inventors: Kengo Horikoshi, Musashino (JP);
Masanori Nakamura, Musashino (JP);
Seiji Okamoto, Musashino (JP);
Etsushi Yamazaki, Musashino (JP);
Asuka Matsushita, Musashino (JP);
Takeo Sasai, Musashino (JP)

(73) Assignee: NTT, Inc., Tokyo (JP)

( * ) Notice: Subject to any disclaimer, the term of this patent is extended or adjusted under 35 U.S.C. 154(b) by 113 days.

(21) Appl. No.: 17/909,884

(22) PCT Filed: Mar. 11, 2020

(86) PCT No.: PCT/JP2020/010578
§ 371 (c)(1),
(2) Date: Sep. 7, 2022

(87) PCT Pub. No.: WO2021/181568
PCT Pub. Date: Sep. 16, 2021

(65) Prior Publication Data
US 2023/0097741 A1　　Mar. 30, 2023

(51) Int. Cl.
*H04B 10/2525* (2013.01)
*H04B 10/61* (2013.01)
(52) U.S. Cl.
CPC ..... *H04B 10/2525* (2013.01); *H04B 10/6161* (2013.01)

(58) Field of Classification Search
None
See application file for complete search history.

(56) References Cited

U.S. PATENT DOCUMENTS 9,112,609 B2 * 8/2015 Kim ................... H04B 10/2572
9,698,932 B2 * 7/2017 Kisaka .................. H04B 10/50
(Continued)

FOREIGN PATENT DOCUMENTS

EP　　　3235147 B1　11/2018
JP　　2011004264 A　1/2011
(Continued)

OTHER PUBLICATIONS

Israa Slim et al., "Delayed Single-Tap Frequency-Domain Chromatic-Dispersion Compensation", IEEE Photonics Technology Letters, vol. 25, No. 2, Jan. 15, 2013.

*Primary Examiner* — Andrew Jordan
(74) *Attorney, Agent, or Firm* — Harness, Dickey & Pierce, P.L.C.

(57)　　　　　ABSTRACT

An optical reception apparatus includes a wavelength dispersion compensation unit that performs wavelength dispersion compensation individually on reception signals that are obtained by receiving, by a coherent detecting scheme, an optical signal modulated in a subcarrier modulation scheme and by performing division on a subcarrier-by-subcarrier basis, and a plurality of delay compensation units that compensate for a delay between reception signals at different subcarriers among the reception signals at subcarriers obtained by the wavelength dispersion compensation.

4 Claims, 16 Drawing Sheets

(56) References Cited

U.S. PATENT DOCUMENTS

| | | | | |
|---|---|---|---|---|
| 9,973,276 | B2 * | 5/2018 | Kai | H04B 10/2507 |
| 10,735,103 | B2 * | 8/2020 | Noguchi | H04J 14/0298 |
| 11,632,184 | B2 * | 4/2023 | Noguchi | H04J 14/0298 |
| | | | | 398/79 |
| 11,683,093 | B2 * | 6/2023 | Nakamura | H04B 10/616 |
| | | | | 398/29 |
| 2001/0055137 | A1 * | 12/2001 | Kuri | H04B 10/50 |
| | | | | 398/163 |
| 2010/0325184 | A1 | 12/2010 | Kanayama et al. | |
| 2011/0002689 | A1 | 1/2011 | Sano et al. | |
| 2013/0287390 | A1 * | 10/2013 | Abe | H04L 25/03038 |
| | | | | 398/208 |
| 2014/0363164 | A1 * | 12/2014 | Kim | H04B 10/2572 |
| | | | | 398/65 |
| 2015/0280853 | A1 | 10/2015 | Sun et al. | |
| 2016/0065326 | A1 * | 3/2016 | Kisaka | H04B 10/532 |
| | | | | 398/65 |
| 2017/0272161 | A1 * | 9/2017 | Kai | H04B 10/40 |
| 2018/0248582 | A1 | 8/2018 | Yasuda et al. | |
| 2019/0044619 | A1 | 2/2019 | Nakashima et al. | |
| 2020/0052794 | A1 * | 2/2020 | Noguchi | H04L 25/03885 |
| 2020/0067598 | A1 | 2/2020 | Yoshida et al. | |
| 2022/0166534 | A1 * | 5/2022 | Noguchi | H04B 10/506 |
| 2022/0224415 | A1 | 7/2022 | Nakamura et al. | |
| 2023/0097741 | A1 * | 3/2023 | Horikoshi | H04J 14/0298 |
| | | | | 385/123 |
| 2024/0356655 | A1 * | 10/2024 | Matsuda | H04J 14/02 |
| 2024/0380388 | A1 * | 11/2024 | Kobayashi | H03H 17/0213 |

FOREIGN PATENT DOCUMENTS

| | | |
|---|---|---|
| JP | 6376211 B2 | 8/2018 |
| JP | 2019-029937 A | 2/2019 |
| WO | WO-2013139395 A1 | 9/2013 |
| WO | WO-2017/033550 A1 | 3/2017 |

* cited by examiner

OPTICAL RECEIVING APPARATUS AND OPTICAL RECEIVING METHOD USING CHANGING COEFFICIENT VALUES FOR FAST FOURIER TRANSFORM

CROSS-REFERENCE TO RELATED APPLICATIONS

This application is a 371 U.S. National Phase of International Application No. PCT/JP2020/010578, filed on Mar. 11, 2020. The entire disclosure of the above application is incorporated herein by reference.

TECHNICAL FIELD

The present disclosure relates to an optical receiving apparatus and an optical receiving method.

BACKGROUND ART

Digital coherent transmission performs equalization processing of compensating for waveform distortion occurring in an optical fiber by using digital signal processing (DSP) (see NPL 1, for example).

CITATION LIST

Non Patent Literature

NPL 1: Slim, A. Mezghani, L. G. Baltar, J. Qi, F. N. Hauske and J. A. Nossek, "Delayed Single-Tap Frequency-Domain Chromatic-Dispersion Compensation," in IEEE Photonics Technology Letters, vol. 25, no. 2, pp. 167 to 170, Jan. 15, 2013.

SUMMARY OF THE INVENTION

Technical Problem

In recent years, the application range of equalization processing has expanded to achieve longer-distance transmission. Unfortunately, this equalization processing needs a relatively large circuit scale to perform dispersion compensation. Thus, a large amount of power is consumed.

In view of the aforementioned circumstance, an object of the present disclosure is to provide a technology that enables dispersion compensation with low power consumption.

Means for Solving the Problem

An aspect of the present disclosure provides an optical reception apparatus including a wavelength dispersion compensation unit that performs wavelength dispersion compensation individually on reception signals that are obtained by receiving, by a coherent detecting scheme, an optical signal modulated in a subcarrier modulation scheme and by performing division on a subcarrier-by-subcarrier basis, and a plurality of delay compensation units that compensate for a delay between reception signals at different subcarriers among the reception signals at subcarriers obtained by the wavelength dispersion compensation.

An aspect of the present disclosure provides an optical reception method including performing wavelength dispersion compensation individually on reception signals that are obtained by receiving, by a coherent detecting scheme, an optical signal modulated in a subcarrier modulation scheme and by performing division on a subcarrier-by-subcarrier basis, and compensating for a delay between reception signals at different subcarriers among the reception signals at subcarriers obtained by the wavelength dispersion compensation.

Effects of the Invention

The present disclosure enables dispersion compensation with low power consumption.

DESCRIPTION OF EMBODIMENTS

Hereinafter, embodiments of the present disclosure will be described with reference to the drawings.

First Embodiment

Figure 1:
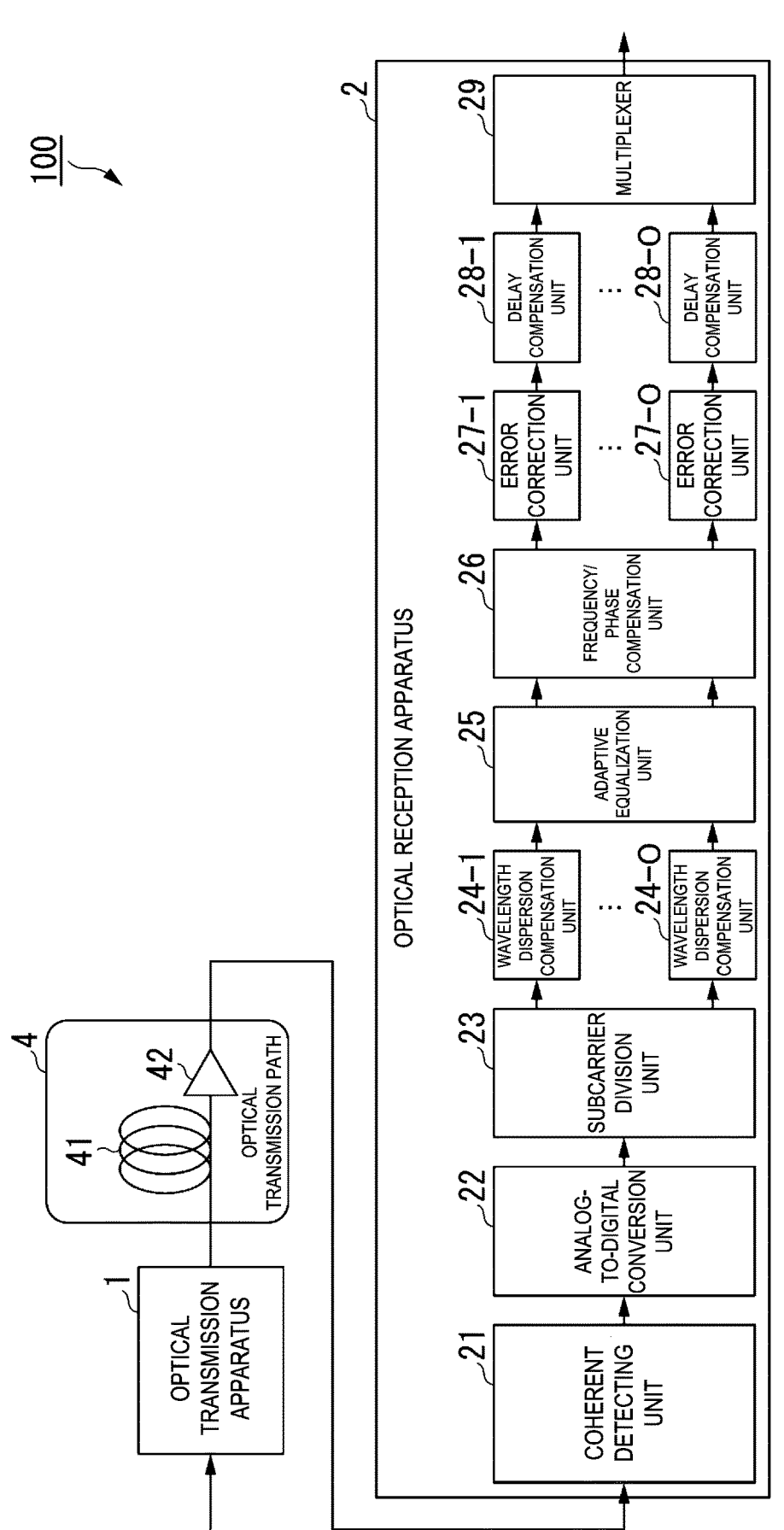
FIG. 1 is a block diagram illustrating a configuration of an optical transmission system according to a first embodiment.

FIG. 1 is a block diagram illustrating a configuration of an optical transmission system 100 according to a first embodiment. The optical transmission system 100 includes an optical transmission apparatus 1, an optical reception apparatus 2, and an optical transmission path 4. The optical transmission apparatus 1 and the optical reception apparatus 2 are communicably connected via the optical transmission path 4. The optical transmission path 4 includes an optical fiber 41 and an optical amplifier 42. The optical transmission path 4 transmits an optical signal sent by the optical transmission apparatus 1 to the optical reception apparatus 2.

The optical transmission apparatus 1 encodes transmission information given from an external information source to generate an electrical signal, converts the generated electrical signal into an optical signal, and transmits the optical signal to the optical reception apparatus 2 via the optical transmission path 4.

The optical reception apparatus 2 includes a coherent detecting unit 21, an analog-to-digital conversion unit 22, a subcarrier division unit 23 (subcarrier divider), a plurality of wavelength dispersion compensation units 24-1 to 24-O (O is an integer that is equal to or greater than two) (wavelength dispersion compensator, wavelength dispersion compensators), an adaptive equalization unit 25 (adaptive equalizer), a frequency/phase compensation unit 26 (frequency/phase compensators), a plurality of error correction units 27-1 to 27-O (error correctors), a plurality of delay compensation units 28-1 to 28-O (delay compensators), and a multiplexer 29. The numbers of the wavelength dispersion compensation units 24, the error correction units 27, and the delay compensation units 28 included in the optical reception apparatus 2 correspond to the number of subcarriers.

The coherent detecting unit 21 causes a received optical signal to interfere with local light emission and converts the optical signal into a baseband analog electrical signal. The analog-to-digital conversion unit 22 converts the analog electrical signal output by the coherent detecting unit 21 into a digital electrical signal.

The subcarrier division unit 23 divides the aforementioned digital electrical signal into digital electrical signals in accordance with the subcarriers. Each digital electrical signal of each subcarrier after division by the subcarrier division unit 23 is input to the wavelength dispersion compensation units 24-1 to 24-O.

Here, if the number of subcarriers is 4 (O is 4), the subcarrier division unit 23 divides the digital electrical signal output from the analog-to-digital conversion unit 22 into four digital electrical signals of the subcarriers. Then, the subcarrier division unit 23 inputs four divided digital electrical signals of the subcarriers to four corresponding wavelength dispersion compensation units 24-1 to 24-4.

The wavelength dispersion compensation units 24-1 to 24-O compensate for wavelength dispersion of the input digital electrical signals occurring in transmission paths. For example, the wavelength dispersion compensation units 24-1 to 24-O compensate for the wavelength dispersion occurring in the transmission paths for each subcarrier through digital signal processing such as a finite impulse response (FIR) filter or frequency domain equalization.

The adaptive equalization unit 25 dynamically estimates and equalizes polarization, laser phase noise, and the like that occur in the optical transmission path 4 and dynamically vary, through the aforementioned digital signal processing such as an FIR filter and frequency domain equalization. More specifically, the adaptive equalization unit 25 compensates for distortion occurring in the waveform of the optical signal in the optical transmission path 4. In other words, the adaptive equalization unit 25 corrects a code error occurring in the optical signal due to interference between codes (interference between symbols) in the optical transmission path 4.

The frequency/phase compensation unit 26 executes processing of compensating for a frequency offset and processing of compensating for a phase offset on the signal on which the adaptive equalization processing has been executed.

The error correction units 27-1 to 27-O perform error correction on input signals.

The delay compensation units 28-1 to 28-O compensate for delays among the subcarriers. It is desirable that the delay compensation units 28-1 to 28-O be installed in a later stage of the adaptive equalization unit 25 and the frequency/phase compensation unit 26 in terms of the amount of arithmetic operation. The delay compensation units 28-1 to 28-O perform two schemes, namely a method of performing delay compensation in a symbol domain and a scheme of performing delay compensation in a bit domain. However, in a case in which a soft decision code is used as an error correction code, and coding across a plurality of subcarriers is performed, it is necessary for the delay compensation units to perform delay compensation in a symbol domain.

The multiplexer 29 merges a plurality of signals after the delay compensation among the subcarriers into one system and outputs the one system.

Figure 2:
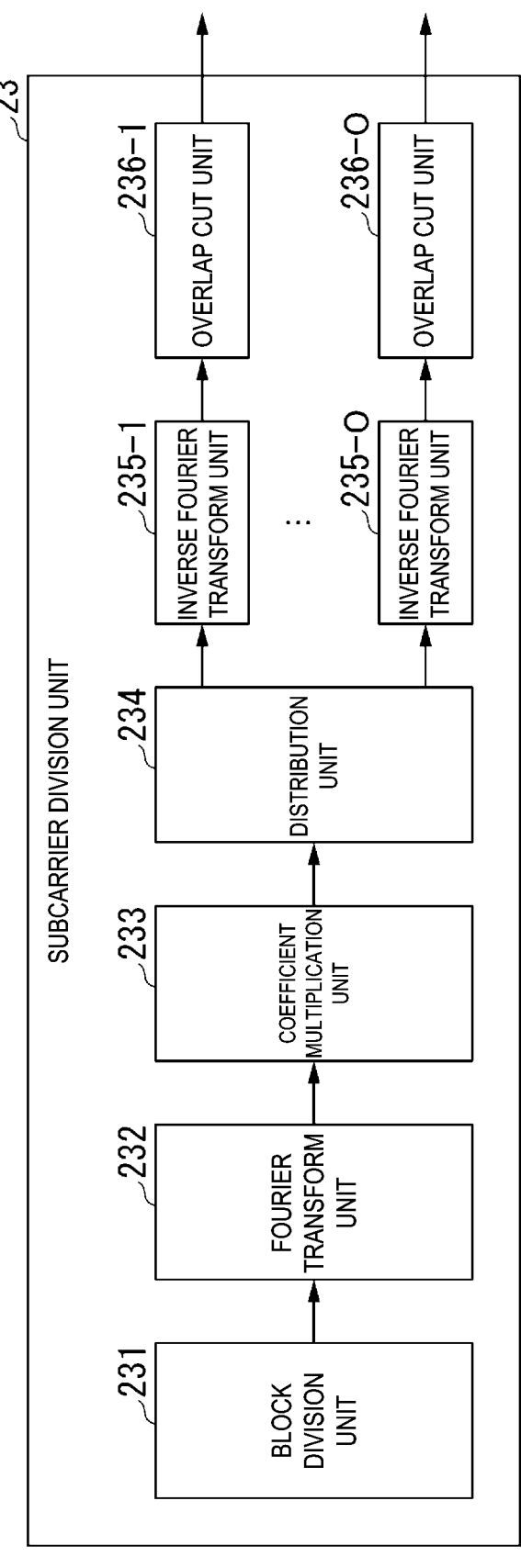
FIG. 2 is a block diagram illustrating a configuration of a subcarrier division unit according to the first embodiment.

FIG. 2 is a block diagram illustrating a configuration of the subcarrier division unit 23 according to the first embodiment. The subcarrier division unit 23 includes a block division unit 231, a Fourier transform unit 232, a coefficient multiplication unit 233, a distribution unit 234, a plurality of inverse Fourier transform units 235-1 to 235-O, and a plurality of overlap cut units 236-1 to 236-O.

The block division unit 231 divides an input signal into blocks to match a size of a Fourier transform performed by the Fourier transform unit 232. At this time, the block division unit 231 divides the input signal into blocks such that temporally adjacent blocks partially overlap (one-fourth, for example). This is a process for maintaining continuity among the blocks even after execution of the signal processing.

The Fourier transform unit 232 performs a Fourier transform on the blocks that are successively output by the block division unit 231. In other words, the Fourier transform unit 232 converts a time domain signal into a frequency domain signal. When the Fourier transform unit 232 performs the Fourier transform, the Fourier transform unit 232 performs a discrete Fourier transform or a fast Fourier transform.

The coefficient multiplication unit 233 multiplies a frequency domain signal output from the Fourier transform unit 232 by a compensation coefficient. The compensation coefficient of the multiplication performed by the coefficient multiplication unit 233 is for incompleteness compensation of an electric device on a reception side rather than the wavelength dispersion compensation.

The distribution unit 234 divides a frequency domain signal output from the coefficient multiplication unit 233 into a plurality of partial domain signals centering respective subcarriers. Each signal of each subcarrier split by the distribution unit 234 is input to the inverse Fourier transform units 235-1 to 235-O. The domains divided by the distribution unit 234 may or may not overlap each other. In a case in which disposition of the subcarriers is uniform over the entire frequency band region, it is possible to split the domains without overlapping. Here, the distribution unit 234 divides the aforementioned frequency domain signal into partial domain signals to match the size of the inverse Fourier transform performed by the inverse Fourier transform units 235-1 to 235-O.

The inverse Fourier transform units 235-1 to 235-O perform an inverse Fourier transform on the input subcarrier signals. In other words, the inverse Fourier transform units 235-1 to 235-O transform frequency domain signals into time domain signals. When the inverse Fourier transform units 235-1 to 235-O perform an inverse Fourier transform, the inverse Fourier transform units 235-1 to 235-O perform an inverse discrete Fourier transform or an inverse fast Fourier transform.

The overlap cut units 236-1 to 236-O cut one-fourth portion, for example, which is an overlapping portion, from blocks output from the inverse Fourier transform unit 244, perform parallel-to-serial conversion on the cut blocks, and output samples with a three-fourth length. At this time, each subcarrier is converted into a baseband signal.

Figure 3:
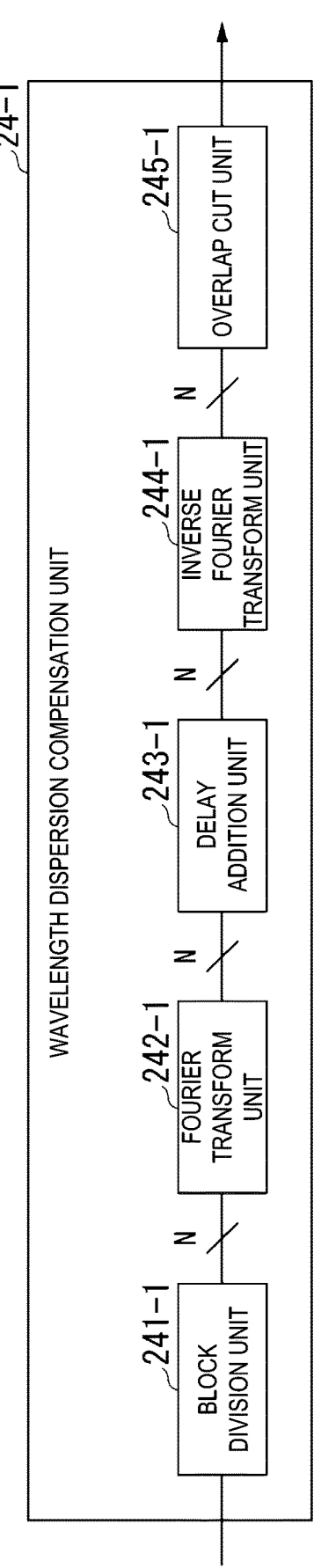
FIG. 3 is a block diagram illustrating a configuration of a wavelength dispersion compensation unit according to the first embodiment.

FIG. 3 is a block diagram illustrating a configuration of the wavelength dispersion compensation unit 24-1 according to the first embodiment. The wavelength dispersion compensation units 24-1 to 24-O have the same configuration. Thus, the wavelength dispersion compensation unit 24-1 will be described as an example. The wavelength dispersion compensation unit 24-1 includes a block division unit 241-1, a Fourier transform unit 242-1, a delay addition unit 243-1, an inverse Fourier transform unit 244-1, and an overlap cut unit 245-1. In FIG. 3, "N" shown on the connection line between the functional units denotes that N blocks including a value are input and output. The same applies to other diagrams after FIG. 3.

The block division unit 241-1 divides a digital signal output by the analog-to-digital conversion unit 22 into blocks such that a sample number of 1/M with a block size N of a Fourier transform performed by the Fourier transform unit 242-1 overlaps adjacent blocks. Here, N is a positive integer, and M is a power of two and an integer that satisfies N>M. The block division unit 241-1 performs serial-to-parallel conversion on the divided blocks and outputs each block.

The Fourier transform unit 242-1 performs a Fourier transform on the blocks successively output by the block division unit 241-1. In other words, the Fourier transform unit 242-1 transforms time domain signals of N samples into frequency domain signals of N bins. When the Fourier transform unit 242-1 performs a Fourier transform, the Fourier transform unit 242-1 performs a discrete Fourier transform or a fast Fourier transform.

The delay addition unit 243-1 multiplies each value of each bin of the frequency domain signals output by the Fourier transform unit 242-1 by a different coefficient.

Figure 4:
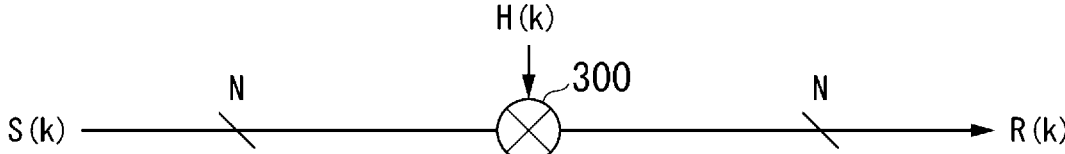
FIG. 4 is a block diagram illustrating a configuration of a typical coefficient multiplication unit with a one-stage configuration that performs wavelength dispersion compensation.
Figure 5:
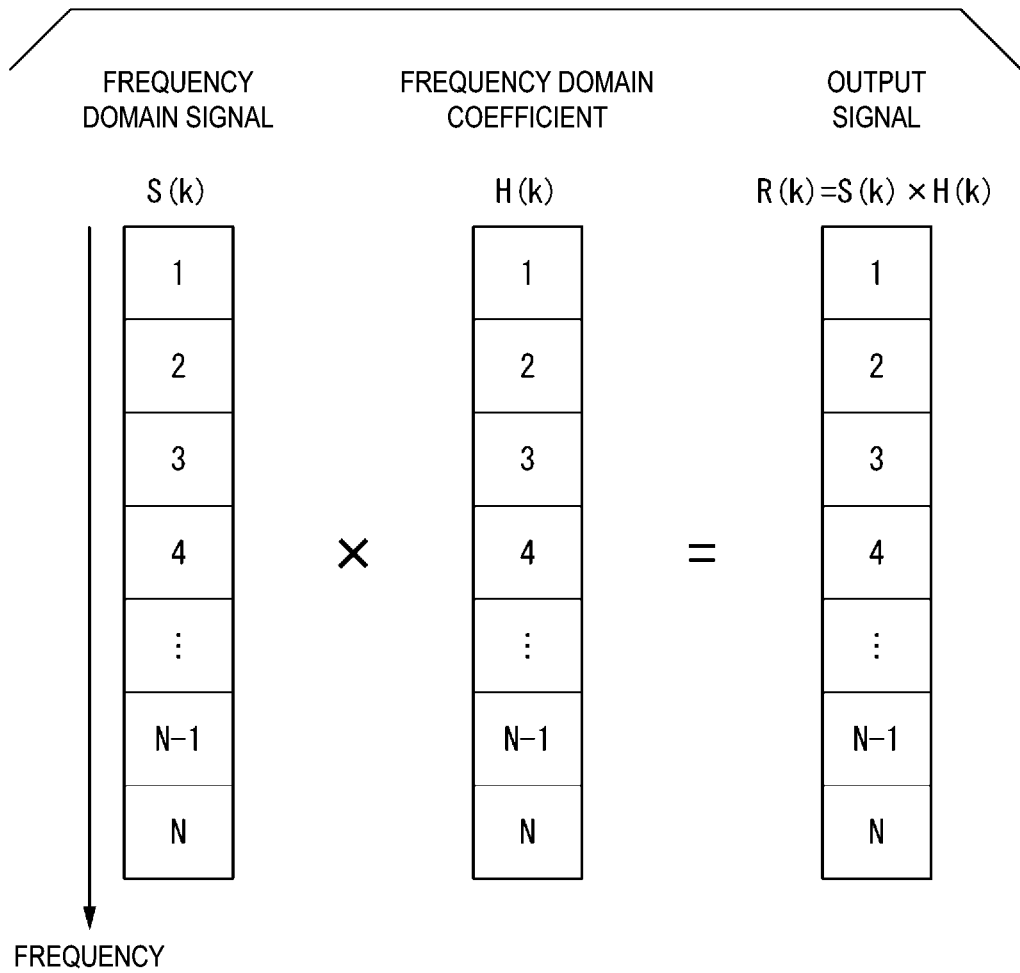
FIG. 5 is a diagram illustrating an arithmetic operation performed by the coefficient multiplication unit with the one-stage configuration.

In a typical configuration in which wavelength dispersion compensation is performed, the functional unit that multiplies by a coefficient employs a configuration including one multiplier 300 as illustrated in FIG. 4, for example. As illustrated in FIG. 5, the functional unit that multiplies by the coefficient calculates an output signal R(k) by multiplying a signal S(k) in the frequency domain, which is a frequency domain signal output by the Fourier transform unit 242, by H(k), which is a coefficient in the frequency domain, by using the multiplier 300. Here, k is an integer that represents a position in the frequency domain, and 1 corresponds to a frequency of zero.

The coefficient H (k) is a value shown in the following equation (1).

[Math. 1]

$$H(k) = \exp\left(\frac{j}{2}\beta_2\omega^2\right) \tag{1}$$

In Equation (1), $\beta_2$ is a wavelength dispersion parameter. $\omega$ is represented by the following equation (2), and its value varies depending on the frequency. Thus, signals of each of the bins of the frequency are multiplied by coefficients different from each other.

[Math. 2]

$$\omega = 2\pi k\Delta f \tag{2}$$

Figure 6:
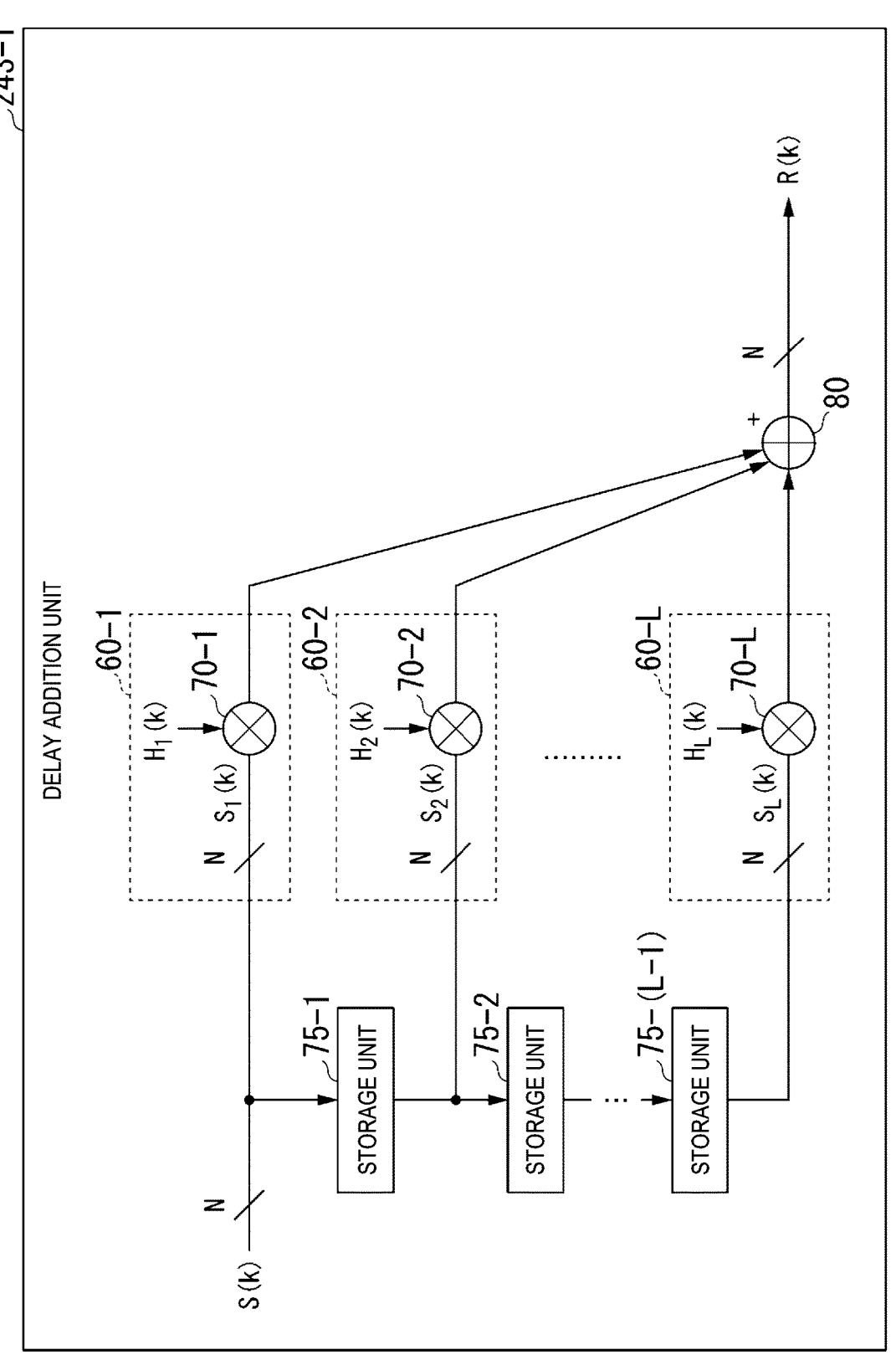
FIG. 6 is a block diagram illustrating a configuration of a delay addition unit according to the first embodiment.

On the other hand, the delay addition unit 243-1 includes storage units 75-1 to 75-(L−1), multiplier arrays 70-1 to 70-L, and an adder 80 in the present embodiment, as illustrated in FIG. 6. For the sake of convenience of description, each of the configurations denoted by the reference signs 60-1 to 60-L respectively including the multiplier arrays 70-1 to 70-L is referred to as a stage level.

Each of the storage units 75-1 to 75-(L−1) stores a block output by the Fourier transform unit 242-1 in each unit time. In a case in which a block at a clock time t output by the Fourier transform unit 242-1 is $S_1(k)$, for example, the storage unit 75-1 stores a block $S_2(k)$ at a clock time t−1. The storage unit 75-2 stores a block $S_3(k)$ at a clock time t−2. The last storage unit 75-(L−1) stores a block $S_L(k)$ at a clock time t−L+b 1.

The multiplier array 70-1 multiplies the block $S_1(k)$ output by the Fourier transform unit 242-1 by a coefficient $H_1(k)$ defined in advance. Each of the multiplier arrays 70-2 to 70-L takes the blocks $S_2(k)$ to $S_L(k)$ stored in the storage units 75-1 to 75-(L−1). The multiplier arrays 70-2 to 70-L respectively multiply the fetched blocks $S_2(k)$ to $S_L(k)$ by coefficients $H_2(k)$ to $H_L(k)$ that are each determined in advance. Each of the multiplier arrays 70-1 to 70-L outputs a multiplication result to the adder 80. Each of the multiplier arrays 70-1 to 70-L is configured with as many multipliers as the number that matches the length of the blocks output by the Fourier transform unit 242-1. This is because as many multipliers as the number calculated by "number of blocks× length of blocks" are required.

Figure 7:
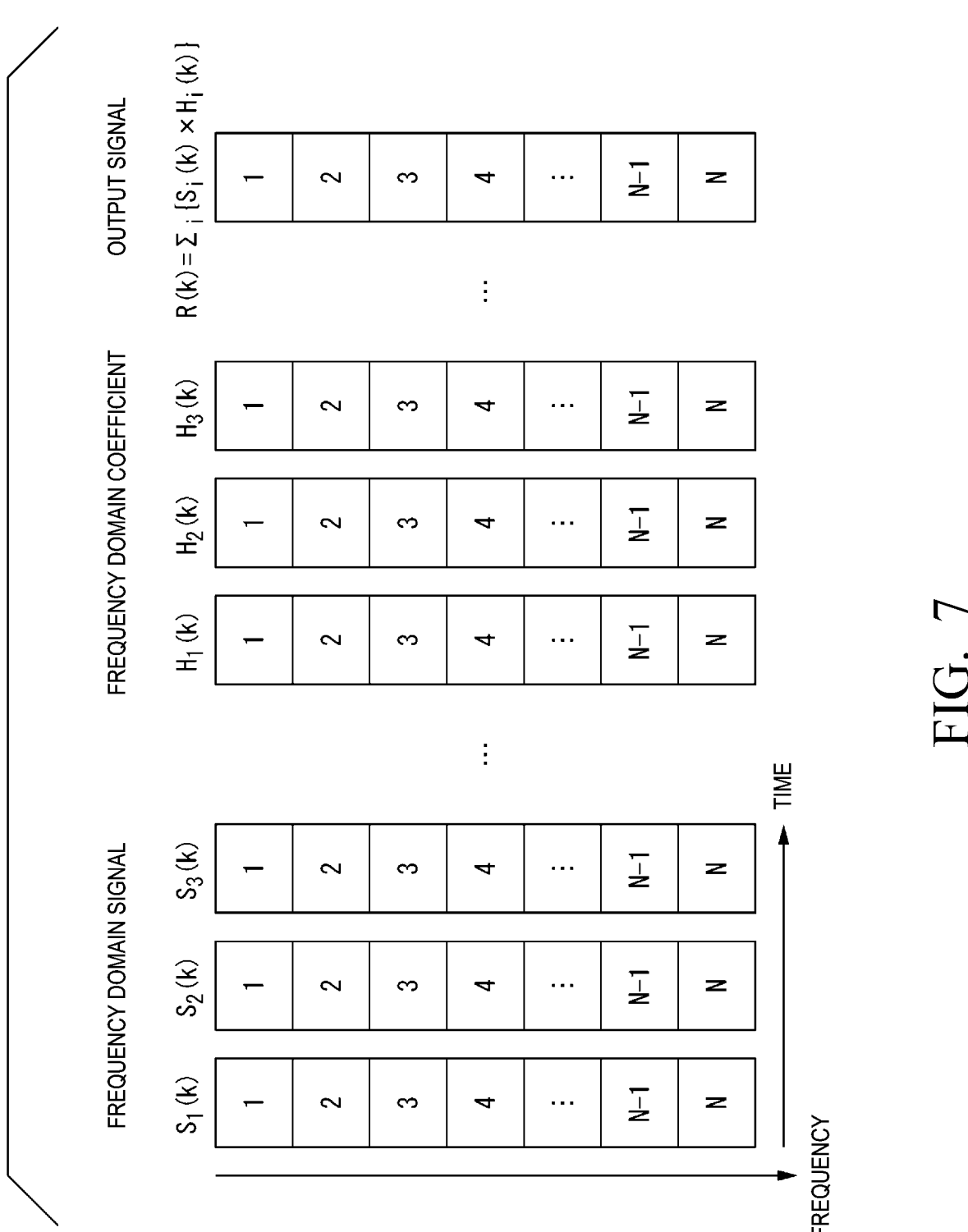
FIG. 7 is a diagram illustrating an arithmetic operation performed by the delay addition unit according to the first embodiment.

As illustrated in FIG. 7, the adder 80 adds the multiplication results output by the multiplier arrays 70-1 to 70-L for each bin. In this manner, the adder 80 calculates an output signal R (k) that includes N values. Note that, in FIG. 7, "i" is an integer from 1 to L.

Here, the coefficients $H_1(k)$ to $H_L(k)$ are each a value shown in the following equation (3).

[Math. 3]

$$H_l(k) = B_l(\omega) \times \exp\left(\frac{j}{2}\beta_2\omega^2 - jl\beta_1\omega\right) \tag{3}$$

In Equation (3), l is from 1 to L, and $\omega$ is expressed by the following equation (4).

[Math. 4]

$$\omega = 2\pi\Delta f(k-1) \tag{4}$$

In Equation (3), $\beta_1$ is expressed by the following equation (5).

[Math. 5]

$$\beta_1 = \Delta t \times N(M-1)/M \tag{5}$$

Specifically, the coefficients $H_1(k)$ to $H_L(k)$ respectively multiplied by the multiplier arrays 70-1 to 70-L are values different for each of the stage levels 60-1 to 60-L, and are coefficients different for each of the bins of the frequency. In Equation (3), the argument of exp consists of the first term being a quadratic component of $\omega$ and the second term being a liner component of $\omega$, which correspond to wavelength dispersion compensation and delay compensation, respectively. The second term is necessary for compensating for delay times that are different depending on the stage level.

Figure 8:
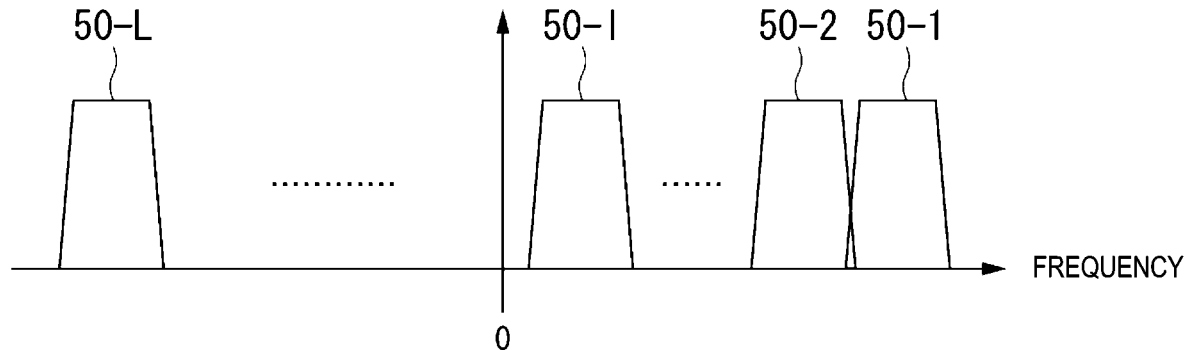
FIG. 8 is a diagram illustrating a configuration of a band path filter according to the first embodiment.

In Equation (3), $B_1(\omega)$ is a band-pass filter, specifically, a window function. $B_1(\omega)$ to $B_L(\omega)$ are bandpass filters 50-1 to 50-L whose positions of the center frequencies are different, as illustrated in FIG. 8, for example. Specifically, the band-pass filter 50-1 of the highest frequency is applied to the stage level 60-1 assigned the smallest number. Then, in sequential order, the band-pass filters 50-2, 50-3, . . . are applied to the stage levels 60-2, 60-3, . . . , and the band-pass filter 50-L of the lowest frequency is applied to the stage level 60-L assigned the largest number. The optical signal that has been subjected to the wavelength dispersion has different delay times depending on the frequency. Thus, with these band-pass filters 50-1 to 50-L, processing of extracting only an appropriate frequency according to wavelength dispersion is performed.

The inverse Fourier transform unit 244-1 performs an inverse Fourier transform on each block output by the delay addition unit 243-1. In other words, the inverse Fourier transform unit 244-1 transforms frequency domain signals of N bins into time domain signals of N samples. When the inverse Fourier transform unit 244-1 performs an inverse Fourier transform, the inverse Fourier transform unit 244-1 performs an inverse discrete Fourier transform or an inverse fast Fourier transform.

The overlap cut unit 245-1 cuts 1/M, which is an overlapping portion, from the blocks output by the inverse Fourier transform unit 244-1. The overlap cut unit 245-1 performs parallel-to-serial conversion on the cut block and outputs a sample with a length of N(M−1)/M.

Figure 9:
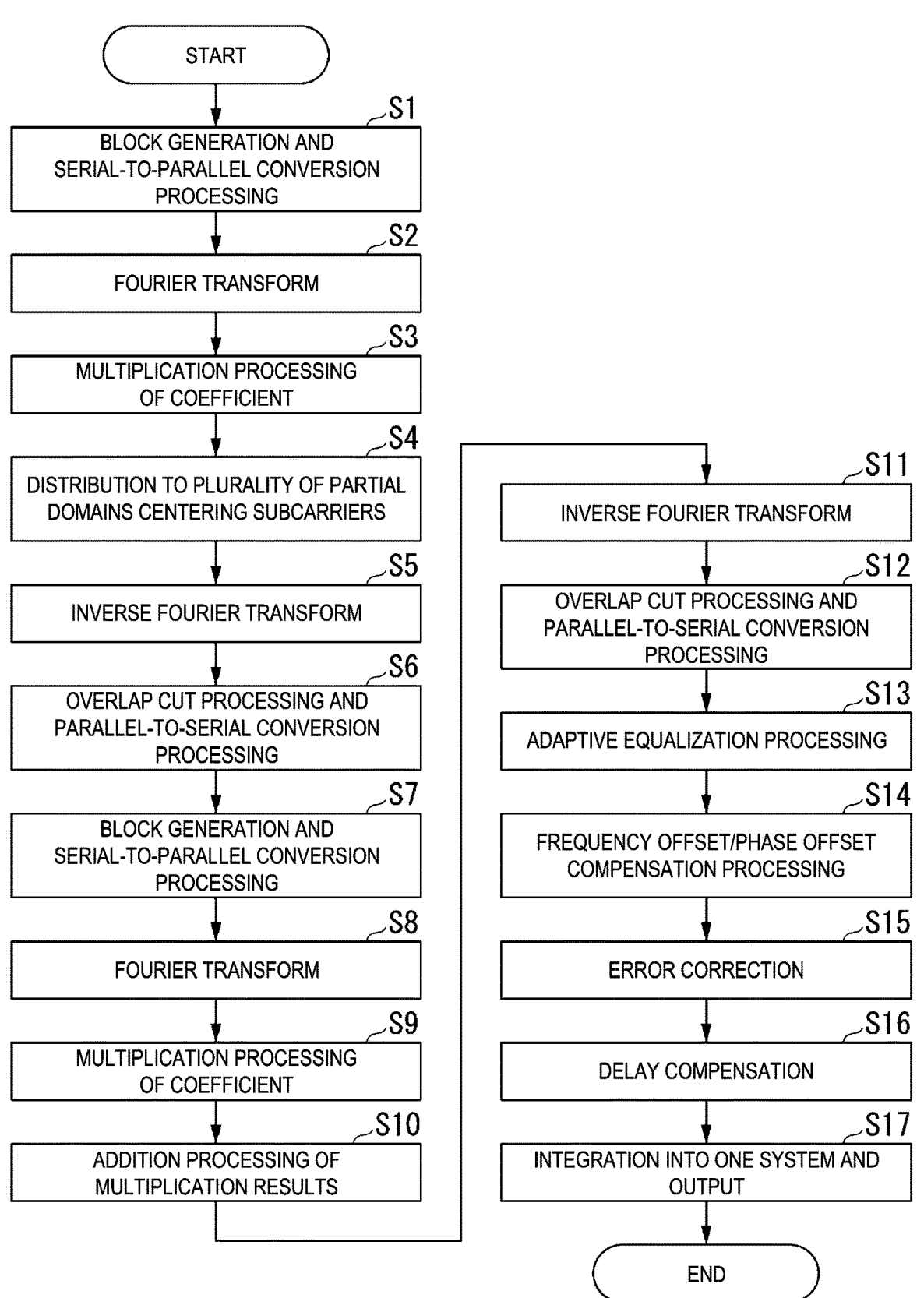
FIG. 9 is a flowchart illustrating a flow of processing performed by an optical reception apparatus according to the first embodiment.

FIG. 9 is a flowchart illustrating a flow of processing performed by the optical reception apparatus 2 according to the first embodiment. The processing in FIG. 9 is executed in a case in which a digital electrical signal is input to the subcarrier division unit 23.

The block division unit 231 causes a block section to shift such that, for example, one-fourth of overlapping portion between adjacent blocks is generated and divides a time domain signal into a plurality of blocks. The block division unit 231 generates the plurality of blocks by buffering the plurality of blocks generated through the division in an internal storage region and performing serial-to-parallel conversion thereon. The block division unit 231 outputs each of the plurality of generated blocks to the Fourier transform unit 232 (Step S1).

The Fourier transform unit 232 performs a Fourier transform on the blocks successively output by the block division unit 231 (Step S2). The Fourier transform unit 232 outputs the frequency domain signal generated for each block through the Fourier transform to the coefficient multiplication unit 233. The coefficient multiplication unit 233 multiplies each block of the frequency domain signal output by the Fourier transform unit 232 and sectioned into blocks by a predetermined compensation coefficient (Step S3). The coefficient multiplication unit 233 outputs the frequency domain signal multiplied by the predetermined compensation coefficient to the distribution unit 234.

The distribution unit 234 divides the plurality of frequency domain signals multiplied by the predetermined compensation coefficient into a plurality of partial domain signals centering respective subcarriers (Step S4). The distribution unit 234 outputs the signal of each subcarrier to the inverse Fourier transform units 235-1 to 235-O. Each of the inverse Fourier transform units 235-1 to 235-O performs an inverse Fourier transform on the input subcarrier signal (Step S5). Each of the inverse Fourier transform units 235-1 to 235-O outputs a signal of one of the subcarriers converted into a time domain signal to the overlap cut units 236-1 to 236-O.

Each of the overlap cut units 236-1 to 236-O cuts an overlapping portion from the blocks output by the inverse Fourier transform unit 244. Then, each of the overlap cut units 236-1 to 236-O performs parallel-to-serial conversion on the cut block and outputs the block to the block division units 241-1 to 241-O.

Each of the block division units 241-1 to 241-O takes a time domain signal s(t) 200 output by the overlap cut units 236-1 to 236-O. Note that the numerical values in each box of the time domain signal s(t) 200 are values of "t" representing time.

Each of the block division units 241-1 to 241-O shifts the block section to cause overlapping of N/M with an adjacent block and divides a time domain signal s(t) 200 into a plurality of blocks. Each of the block division units 241-1 to 241-O buffers the plurality of blocks generated through the division into an internal storage region and performs serial-to-parallel conversion, thereby generating blocks Each of the block division units 241-1 to 241-O outputs each of the generated blocks to one of the Fourier transform units 242-1 to 242-O (Step S7).

Multiplication processing of the coefficient Hl(k) performed by each of the delay addition units 243-1 to 243-O will be described. Here, the block division unit 241-1 will be described as an example. Each of the blocks output by the block division unit 241-1 is defined as a time domain signal x(t). Also, an output of the inverse Fourier transform unit 244-1 is defined as a time domain signal y(t). Here, the coefficient to be multiplied by is defined as h(n) represented by a value in the time domain, the multiplication processing performed by the delay addition unit 243-1 is represented by Equation (6) below.

Multiplication processing of the coefficient $H_1(k)$ performed by each of the delay addition units 243-1 to 243-O will be described. Here, the block division unit 241-1 will be described as an example. Each of the blocks 201, 202, 203, . . . output by the block division unit 241-1 is defined as a time domain signal x(t). Also, an output of the inverse Fourier transform unit 244-1 is defined as a time domain signal y(t). Here, the coefficient to be multiplied by is defined as h(n) represented by a value in the time domain, the multiplication processing performed by the delay addition unit 243-1 is represented by Equation (6) below.

[Math. 6]

$$y[t] = \sum_{n=0}^{N_J-1} h(n)x(t-n) \tag{6}$$

As shown in Equation (6), y[t] is a result of convolution operation of the coefficient h(n) and the time domain signal x(t). By decomposing Equation (6) in groups of N, the following equation (7) is obtained.

[Math. 7]

$$y[t] = \sum_{n=0}^{N_0-1} h(n)x(t-n) + \sum_{n=N_0}^{N_1-1} h(n)x(t-n) + \ldots + \sum_{n=N_{J-1}}^{N_J-1} h(n)x(t-n) \quad (7)$$

In Equation (7), each of $N_0$, $N_1$, ... $N_J$ has the same value. Any of the number of n of 0 to $N_0$, the number of n of $N_0$ to $N_1$-1, ..., and the number of n of $N_{J-1}$ to $N_J$-1 are N.

The Fourier transform unit 242-1 performs a Fourier transform on a time domain signal x(t) to generate a frequency domain signal X(f) (Step S8). A frequency domain signal before the inverse Fourier transform of a time domain signal y(t), which is an output of the inverse Fourier transform unit 244-1, is defined as $Y_m(f)$. In this case, the relationship between X(f) and $Y_m(f)$ is as shown in the following equation (8), which is a result of multiplication operation of the frequency domain coefficient H(f) and the frequency domain signal X(f).

[Math. 8]

$$Y_m(f)=H(f) \times X(f)=H_0(f) \times X_m(f)+H_1(f) \times X_{m-1}(f)+ \ldots$$
$$+H_{J-1}(f) \times X_{m-J+1}(f) \quad (8)$$

The last expression of Equation (8) is an expression obtained by decomposing H (f)×X (f) in groups of N bins of the frequency, and is an expression obtained by performing Fourier transform on the expression on the right-hand side of Equation (7). The delay addition unit 243-1 can be expressed as a functional unit that performs an arithmetic operation of the last equation in Equation (8) using the multiplier arrays 70-1 to 70-J and the adder 80.

Each of the storage units 75-1 to 75-(J−1) stores a block output by the Fourier transform unit 242-1 in each unit time. In a case in which a block at a clock time t output by the Fourier transform unit 242-1 is $X_m(f)$, for example, the storage unit 75-1 stores a block $X_{m-1}(f)$ at the clock time t−1. The storage unit 75-2 stores a block $X_{m-2}(f)$ at a clock time t−2. The last storage unit 75-(J−1) stores a block $X_{m-J+1}(f)$ at a clock time t−J+1.

Each of the multiplier arrays 70-1 to 70-J takes the frequency domain signals $X_{m-1}(f)$ to $X_{m-J+1}(f)$ from one of the storage units 75-1 to 75-(J−1). The multiplier arrays 70-1 to 70-J respectively multiply the fetched $X_{m-1}(f)$, $X_{m-2}(f)$, ..., $X_{m-J+1}(f)$ and the frequency domain coefficients $H_0(f)$, $H_1(f)$, ..., $H_J$-1(f). Then, each of the multiplier arrays 70-1 to 70-J outputs the multiplication result to the adder 80 (Step S9).

The adder 80 calculates a frequency domain signal $Y_m(f)$ by adding the multiplication results output by the multiplier arrays 70-1 to 70-J (Step S10). The inverse Fourier transform unit 244-1 generates the time domain signal y(t) by performing an inverse Fourier transform on the frequency domain signal $Y_m(f)$ and outputs the time domain signal y(t) (Step S11).

The overlap cut unit 245-1 cuts 1/M, which is an overlapping portion, from each of blocks included in the time domain signal y(t) output by the inverse Fourier transform unit 244-1. Specifically, (N(M−1)/M+1)th to Nth elements of each of the blocks are removed. The overlap cut unit 245-1 performs parallel-to-serial conversion on each of the blocks including the N(M−1)/M samples, from which the overlapping portions have been removed, to generate a serial signal 310, and outputs the serial signal 310 (Step S12). Each of the overlap cut units 245-2 to 245-O also performs similar processing on a time domain signal y(t) output by one of the inverse Fourier transform units 244-2 to 244-O.

Each of the wavelength dispersion compensation units 24-1 to 24-O inputs a time domain signal after wavelength dispersion for each subcarrier to the adaptive equalization unit 25. The adaptive equalization unit 25 performs digital signal processing on each input time domain signal (Step S13). The frequency/phase compensation unit 26 executes processing of compensating for a frequency offset and processing of compensating for a phase offset on each time domain signal on which the adaptive equalization processing has been executed (Step S14). The frequency/phase compensation unit 26 outputs each time domain signal of each subcarrier to the error correction units 27-1 to 27-O.

Each of the error correction units 27-1 to 27-O performs error correction on the input time domain signal (Step S15). The delay compensation units 28-1 to 28-O compensate for delays among the subcarriers of the time domain signals output from the error correction units 27-1 to 27-O (Step S16). The multiplexer 29 merges the plurality of time domain signals after the delay compensation among the subcarriers into one system and outputs the one system (Step S17).

The processing performed by the wavelength dispersion compensation unit 24 in the processing illustrated in FIG. 9 is a technique called a delay addition scheme. The delay addition scheme allows for the following processing.

First, the wavelength dispersion compensation unit 24 converts each of a plurality of time frames that are shorter than an impulse response of wavelength dispersion into a frequency domain signal through a fast Fourier transform. Next, the wavelength dispersion compensation unit 24 multiplies each of the frequency domain frame by the individual compensation coefficients and adds them. Then, the wavelength dispersion compensation unit 24 restores a time domain through an inverse fast Fourier transform.

In the processing illustrated in FIG. 9, the optical reception apparatus 2 divides an input signal into blocks to match the size of the fast Fourier transform performed by the Fourier transform unit 232 using the block division unit 231. The signals divided into the blocks are converted into frequency domain signals through a fast Fourier transform by the Fourier transform unit 232. Thereafter, the frequency domain signals are multiplied by the compensation coefficient by the coefficient multiplication unit 233. The frequency domain signals after the multiplication of the compensation coefficient performed by the coefficient multiplication unit 233 are divided into a plurality of partial domains centering respective subcarriers by the distribution unit 234.

Thereafter, the switched frequency domain signals are returned to continuous signals in the time domain through the inverse Fourier transform performed by the inverse Fourier transform unit 235. The signals of each subcarrier returned to the continuous signals are divided into blocks again by the wavelength dispersion compensation unit 24. The signals of each subcarrier divided into the blocks again are converted into signals in the frequency domain. Thereafter, the signals of each subcarrier are input to the individual delay addition units 243 provided in parallel. The wavelength dispersion compensation is independently performed in each subcarrier band. Thus, wavelength dispersion among the subcarriers is not compensated for. Thus, relative delay differences occur among the subcarriers. This is compensated for by the delay compensation units 28-1 to 28-O in the later stage.

In such a method, the signals are returned to continuous signals in the time domain once between the subcarrier division and the dispersion compensation while both the subcarrier division and the dispersion compensation are performed through frequency domain block processing. This is because different block sizes are needed for the subcarrier division and the dispersion compensation. The block size needed for the subcarrier division is smaller than the block size needed for the dispersion compensation. The trend increases in particular as the necessary amount of dispersion compensation increases in the case of long-distance transmission.

The optical reception apparatus 2 configured as described above can perform the dispersion compensation with low power consumption. Specifically, the optical reception apparatus 2 includes the subcarrier division unit 23, the plurality of wavelength dispersion compensation units 24-1 to 24-O, and the plurality of delay compensation units 28-1 to 28-O in the coherent optical transmission performing subcarrier modulation. The subcarrier division unit 23 divides reception signals obtained by receiving, in the coherent detecting scheme, an optical signal modulated in the subcarrier modulation scheme into subcarriers. The plurality of wavelength dispersion compensation units 24-1 to 24-O perform wavelength dispersion compensation on each of the reception signals divided on a subcarrier-by-subcarrier basis. The plurality of delay compensation units 28-1 to 28-O compensate for delays among the subcarriers of the reception signals for each of the subcarriers after the wavelength dispersion compensation. In this manner, the dispersion compensation is performed for each subcarrier in the coherent optical transmission performing the subcarrier modulation. This reduces a circuit scale needed for the dispersion compensation. Moreover, it is possible to perform dispersion compensation with low power consumption in the coherent optical transmission using the subcarrier modulation.

Here, the reason that the total power consumption is reduced by the subcarrier modulation as compared with a single carrier will be described. The most primitive circuit configuration when equalization is performed on a polarization multiplexing signal can be formed using a pair of complex FIR filters in regard to the wavelength dispersion compensation. In this case, the power consumption of the FIR filters is represented by the following Equation (9) when the power consumption is estimated based on the number of times the multiplication is executed per unit time.

[Math. 9]

$$P \propto D\eta^2 B^3 \tag{9}$$

As represented by Equation (9) above, the power consumption is proportional to a wavelength dispersion amount D, is proportional to a square of an oversampling rate $\eta$ (the number of samples per symbol), and is proportional to a cube of the baud rate B. In the case of a K-subcarrier, the baud rate for each subcarrier is 1/K as compared with the case of single carrier. If the wavelength dispersion compensation is performed for each subcarrier, processing of power consumption of $P/K^3$ is performed in parallel of K. The total power consumption is represented by Equation (10) below.

[Math 10]

$$P_{NSC}=P/N^2 \tag{10}$$

As represented by Equation (10) above, the total power consumption is a reciprocal of the square of K as compared with the single carrier. The power consumption needed for the wavelength dispersion compensation is reduced in this manner in a case in which the wavelength dispersion is performed in a closed manner for each subcarrier. At this time, the wavelength dispersion among the subcarriers remains without being compensated for and appears as delays among the subcarriers. Thus, the optical reception apparatus 2 in the present embodiment also compensates for the delays among the subcarriers in the later stage. This allows for the dispersion compensation with low power compensation.

Modification Examples of First Embodiment

Figure 10:
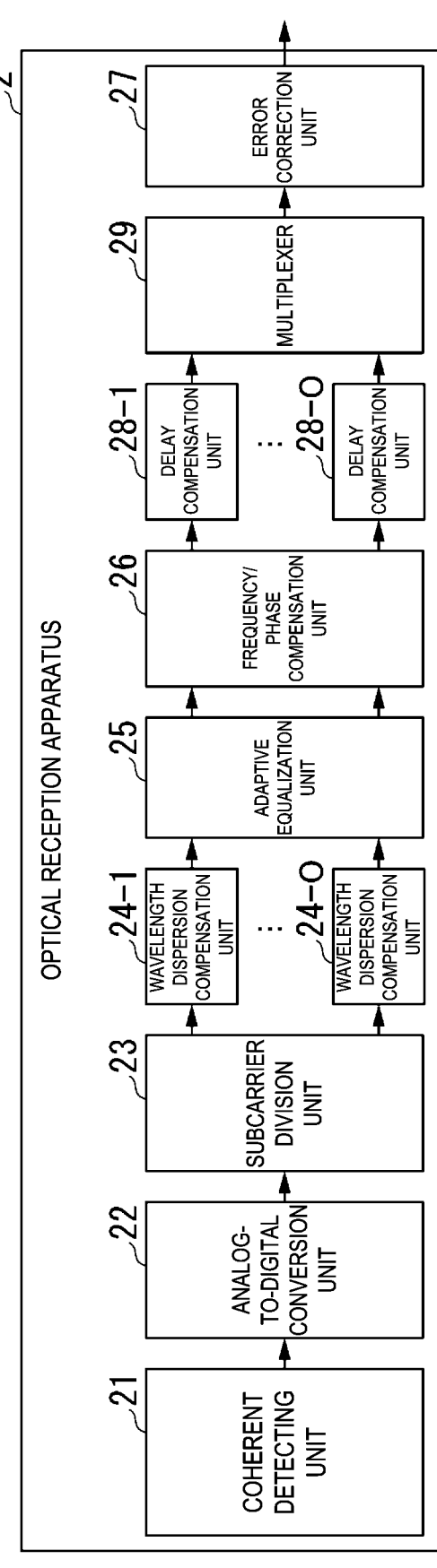
FIG. 10 is a diagram illustrating another configuration example of the optical reception apparatus according to the first embodiment.
Figure 11:
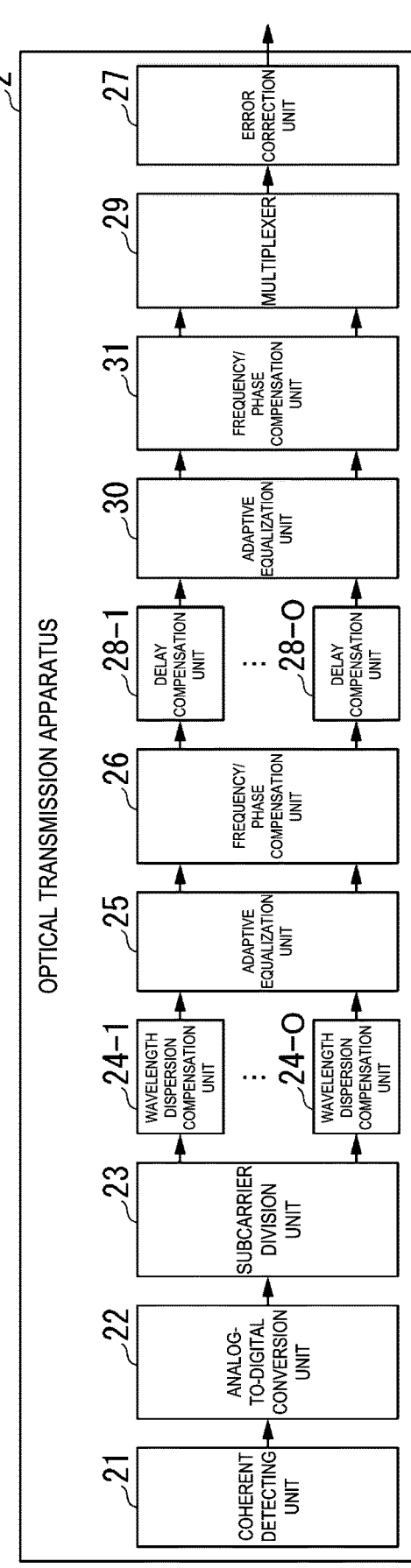
FIG. 11 is a diagram illustrating another configuration example of the optical reception apparatus according to the first embodiment.

The configuration of the optical reception apparatus 2 described above may be a configuration as illustrated in FIGS. 10 and 11. According to the configuration of the optical reception apparatus 2, the error correction code is required to be independent in units of subcarriers. This may limit circuit design. This is also disadvantageous in terms of performance in a case in which signal quality of only a specific subcarrier deteriorates. On the other hand, the configuration illustrated in FIG. 10 has satisfactory power efficiency as compared with the configuration of the optical reception apparatus 2 described above.

FIG. 10 is a diagram illustrating another configuration example of the optical reception apparatus 2 according to the first embodiment. The optical reception apparatus 2 illustrated in FIG. 10 performs delay compensation in a stage prior to the error correction unit 27. More specifically, the optical reception apparatus 2 illustrated in FIG. 10 includes the plurality of delay compensation units 28-1 to 28-O between the frequency/phase compensation unit 26 and the multiplexer 29 and includes the error correction unit 27 in a later stage than the multiplexer 29. Delay compensation is performed on each subcarrier signal after the compensation using the adaptive filter and the phase compensation are performed. After merging into one system is achieved by the multiplexer 29, the error correction is then performed.

In the configuration illustrated in FIG. 10, the plurality of delay compensation units 28-1 to 28-O may be included immediately after the wavelength dispersion compensation units 24-1 to 24-O. In other words, the plurality of delay compensation units 28-1 to 28-O may be included between the wavelength dispersion compensation units 24-1 to 24-O and the adaptive equalization unit 25 in the configuration illustrated in FIG. 10.

The adaptive equalization unit 25 and the frequency/phase compensation unit 26 employ both a method independently performed in units of subcarriers and a method performed in cooperation among the subcarriers. Because linear waveform distortion in an optical fiber does not bring about crosstalk among the subcarriers, it is possible to perform independent processing for each subcarrier. However, because distortion occurring in electrical circuits on the transmission side and the reception side causes crosstalk among the subcarriers, it is necessary to perform the cooperative processing among the subcarriers.

When the crosstalk among the subcarriers is to be compensated for, the state of the delays among the subcarriers needs to be the same state as that when the crosstalk occurs. Thus, although the configuration in FIG. 10 is effective for the compensation of crosstalk among the subcarriers occurring in the electrical circuit on the reception side, it is not possible to compensate for crosstalk among the subcarriers occurring in the electronic circuit on the transmission side. On the other hand, the configuration illustrated in FIG. 11 can be expected to have high performance, although it is disadvantageous in terms of power consumption. FIG. 11 is a diagram illustrating another configuration example of the optical reception apparatus 2 according to the first embodiment. The configuration illustrated in FIG. 11 is a configuration in which a combination of the adaptive equalization unit and the frequency/phase compensation unit is disposed before and after each of the delay compensation units 28-1 to 28-O to address crosstalk among the subcarriers occurring on both the transmission side and the reception side. More specifically, the optical reception apparatus 2 illustrated in FIG. 11 includes the adaptive equalization unit 25 and the frequency/phase compensation unit 26 in a stage prior to the delay compensation units 28-1 to 28-O and the adaptive equalization unit 30 and the frequency/phase compensation unit 31 in a later stage than the delay compensation units 28-1 to 28-O in the configuration illustrated in FIG. 10.

In the aforementioned embodiment, the optical reception apparatus 2 returns signals into signals in the time domain once before the signals are output from the subcarrier division unit 23. The reason that signals are returned to the time domain once in this manner is for conversion of the block size. Employing fast Fourier transform and inverse fast Fourier transform algorithms in the optical reception apparatus 2 achieves the conversion of the block size, not necessarily converting the signals into continuous signals in the time domain. In this case, the optical reception apparatus 2 includes a plurality of block size conversion units (block size converter) instead of the inverse Fourier transform units 235-1 to 235-O, the overlap cut units 236-1 to 236-O, the block division units 241-1 to 241-O, and the Fourier transform units 242-1 to 242-O. The number of block size conversion units that can be included is the number of subcarriers. The block size conversion units convert the block size of the frequency domain signal on a subcarrier-by-subcarrier basis output from the distribution unit 234 into a block size needed to perform the dispersion compensation. The block size conversion units output respective frequency domain signals on a subcarrier-by-subcarrier basis after the conversion of the block size to the delay addition units 243-1 to 243-O.

Second Embodiment

In the first embodiment, the subcarrier division unit 23 and the plurality of wavelength dispersion compensation units 24-1 to 24-O are included as separate functional units in the optical reception apparatus 2. The subcarrier division unit 23 and the plurality of wavelength dispersion compensation units 24-1 to 24-O may be configured in an integrated manner. Thus, a configuration in which the subcarrier division unit 23 and the plurality of wavelength dispersion compensation units 24-1 to 24-O are integrated will be described in a second embodiment.

Figure 12:
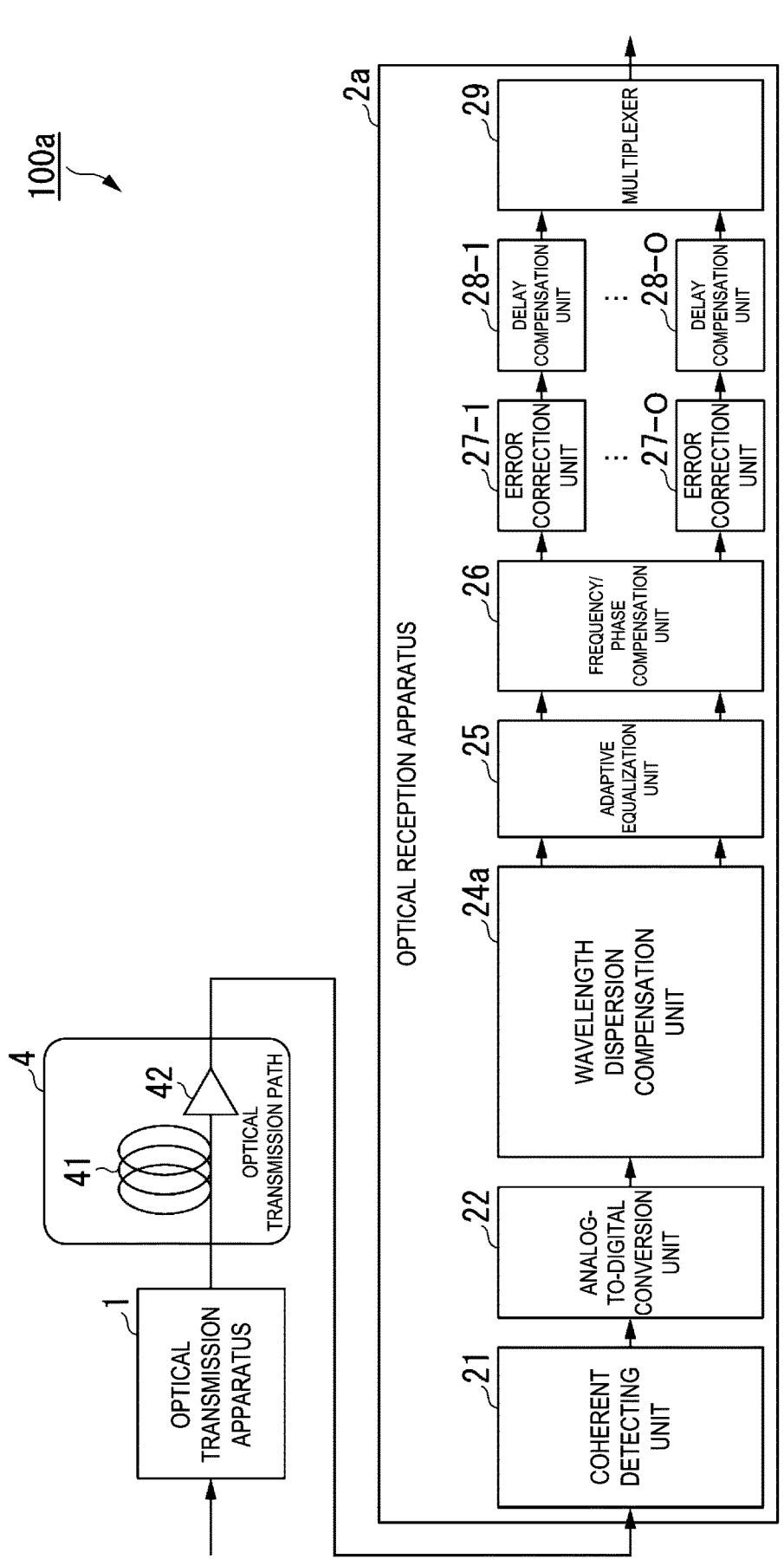
FIG. 12 is a block diagram illustrating a configuration of an optical transmission system according to a second embodiment.

FIG. 12 is a block diagram illustrating a configuration of an optical transmission system 100a according to the second embodiment. The optical transmission system 100a includes an optical transmission apparatus 1, an optical reception apparatus 2a, and an optical transmission path 4. The optical transmission apparatus 1 and the optical reception apparatus 2a are communicably connected via the optical transmission path 4.

Figure 13:
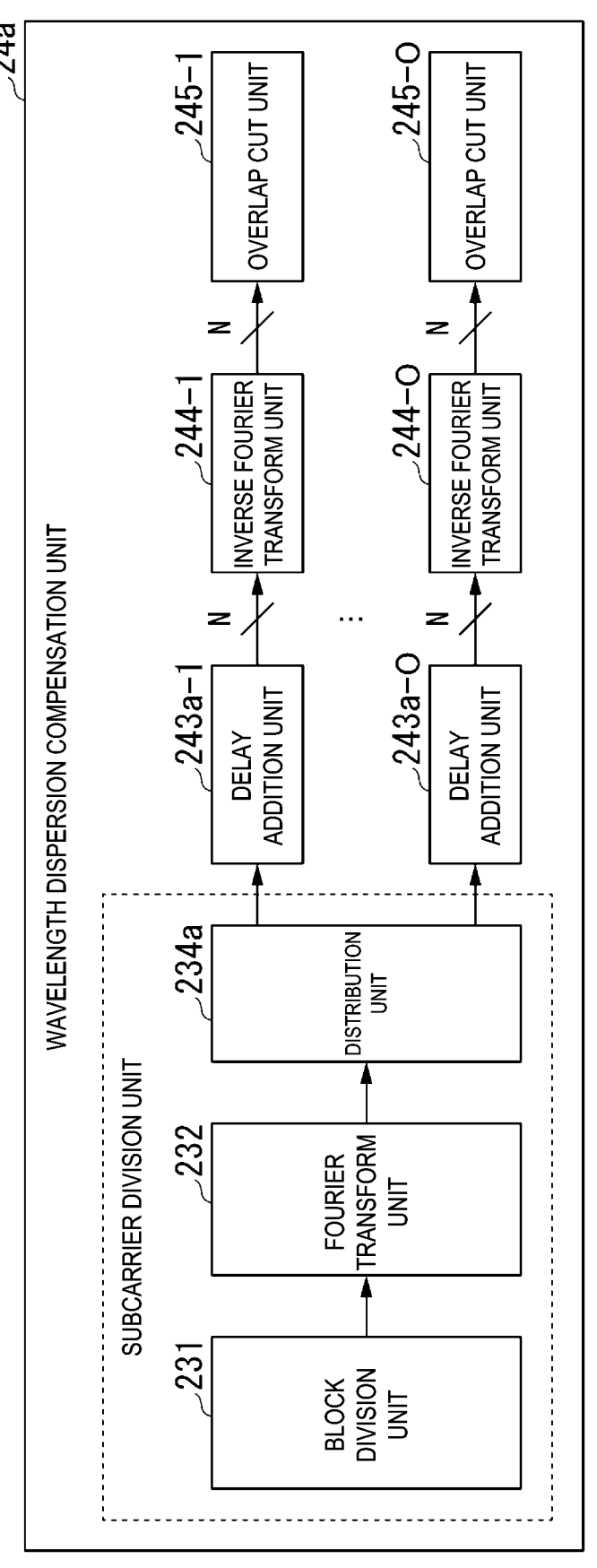
FIG. 13 is a block diagram illustrating a configuration of a wavelength dispersion compensation unit according to the second embodiment.

The optical reception apparatus 2a includes a coherent detecting unit 21, an analog-to-digital conversion unit 22, a wavelength dispersion compensation unit 24a, an adaptive equalization unit 25, a frequency/phase compensation unit 26, a plurality of error correction units 27-1 to 27-O, a plurality of delay compensation units 28-1 to 28-O, and a multiplexer 29. The wavelength dispersion compensation unit 24a includes a block division unit 231, a Fourier transform unit 232, a distribution unit 234a, a plurality of delay addition units 243a-1 to 243a-O, a plurality of inverse Fourier transform units 244-1 to 244-O, and a plurality of overlap cut units 245-1 to 245-O as illustrated in FIG. 13.

In the second embodiment, the block division unit 231, the Fourier transform unit 232, and the distribution unit 234a included in the subcarrier division unit 23 in the first embodiment are incorporated as the wavelength dispersion compensation unit 24a, and the plurality of block division units 241-1 to 241-O and the plurality of Fourier transform units 242-1 to 242-O included in the wavelength dispersion compensation unit 24 are not included. In the optical reception apparatus 2a, the Fourier transform size in an input stage is defined as a size capable of covering a time width needed for processing in the later stage. At this time, the Fourier transform size in the input stage is the number obtained by multiplying the size needed in the configuration in the first embodiment by the number of subcarriers.

In the second embodiment, the block division unit 231, the Fourier transform unit 232, the plurality of inverse Fourier transform units 244-1 to 244-O, and the plurality of overlap cut units 245-1 to 245-O perform similar processing to that of the functional units of the same names in the first embodiment.

In the second embodiment, the distribution unit 234a divides a frequency domain signal output from the Fourier transform unit 232 into a plurality of partial domain signals centering respective subcarriers. The distribution unit 234a divides the frequency domain signal into the partial domain signals to match the size of the inverse Fourier transform performed by the inverse Fourier transform units 244-1 to 244-O. Then, the distribution unit 234a outputs each of the plurality of split partial domain signals to the delay addition units 243a-1 to 243a-O.

The delay addition units 243a-1 to 243a-O perform similar processing to that of the delay addition units 243-1 to 243-O in the first embodiment. Moreover, the delay addition units 243a-1 to 243a-O perform similar processing to that of the coefficient multiplication unit 233 in the first embodiment. In other words, the delay addition units 243a-1 to 243a-O also compensate for reception properties in the second embodiment.

Figure 14:
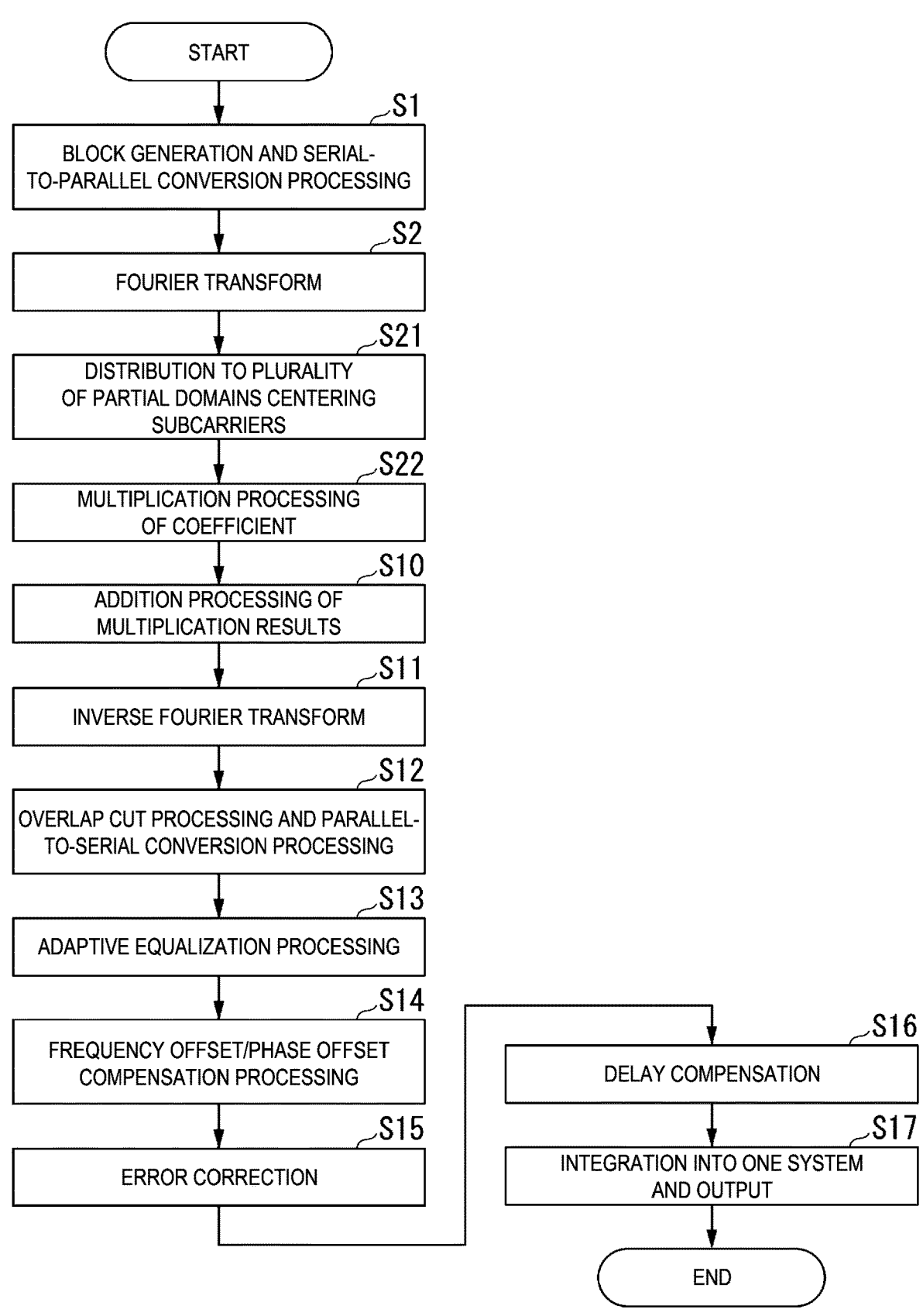
FIG. 14 is a flowchart illustrating a flow of processing performed by an optical reception apparatus according to the second embodiment.

FIG. 14 is a flowchart illustrating a flow of processing performed by the optical reception apparatus 2a in the second embodiment. The processing in FIG. 14 is executed in a case in which a digital electrical signal is input to the wavelength dispersion compensation unit 24a. In FIG. 14, description of processing similar to that in FIG. 9 will be omitted by applying similar signs to those in FIG. 9. In the optical reception apparatus 2a according to the second embodiment, each frequency domain signal generated for each block through the Fourier transform performed by the Fourier transform unit 232 is input to the distribution unit 234a. The distribution unit 234a divides the input frequency domain signal of each block into a plurality of frequency domain signals of partial domains centering subcarriers (Step S21). The distribution unit 234a outputs the frequency domain signal of each subcarrier to the delay addition units 243a-1 to 243a-O.

Each of the delay addition units 243a-1 to 243a-O multiplies the input frequency domain signal of each subcarrier by the compensation coefficient first. The compensation coefficient is a coefficient for compensating for incompleteness of an electrical device similarly to the first embodiment. Thereafter, each of the delay addition units $243a$-1 to $243a$-O multiplies each value of each bin of the frequency domain signals by a different coefficient (Step S22). Thereafter, the processing in and after Step S10 is executed.

The optical reception apparatus $2a$ configured as described above has a simpler configuration as compared with the first embodiment and thus reduces the cost of the apparatus. Also, it is possible to integrate the coefficient multiplication unit for compensating for incompleteness of the reception-side electric device with the delay addition units 243-1 to 243-O and to reduce the necessary number of times of multiplication.

Modification Example of Second Embodiment

The optical reception apparatus $2a$ may be modified similarly to the first embodiment. For example, the optical reception apparatus $2a$ may be configured to perform delay compensation in the previous stage of the error correction unit 27. For example, the optical reception apparatus $2a$ may be configured to include the adaptive equalization unit 25 and the frequency/phase compensation unit 26 in the previous stage of the delay compensation units 28-1 to 28-O and include the adaptive equalization unit 30 and the frequency/ phase compensation unit 31 in the later stage of the delay compensation units 28-1 to 28-O as illustrated in FIG. 11.

Third Embodiment

As described above, the optical reception apparatuses according to the first and second embodiments use a technique called a delay addition scheme. A scheme for performing wavelength dispersion compensation includes a delay selection scheme in addition to the delay addition scheme (see NPL 1, for example). In a third embodiment, a configuration of applying the delay selection scheme instead of the delay addition scheme in the optical reception apparatus will be described. Also, a case in which a wavelength dispersion compensation unit uses the delay selection scheme instead of the delay addition scheme in the system configuration similar to that in the first embodiment will be described in the third embodiment.

The delay selection scheme is a scheme in which a responsible frequency range is defined among a plurality of frames and a coefficient of a non-responsible region is changed to zero. At this time, an addition unit that adds signals from each frame substantially functions as a switch.

Figure 15:
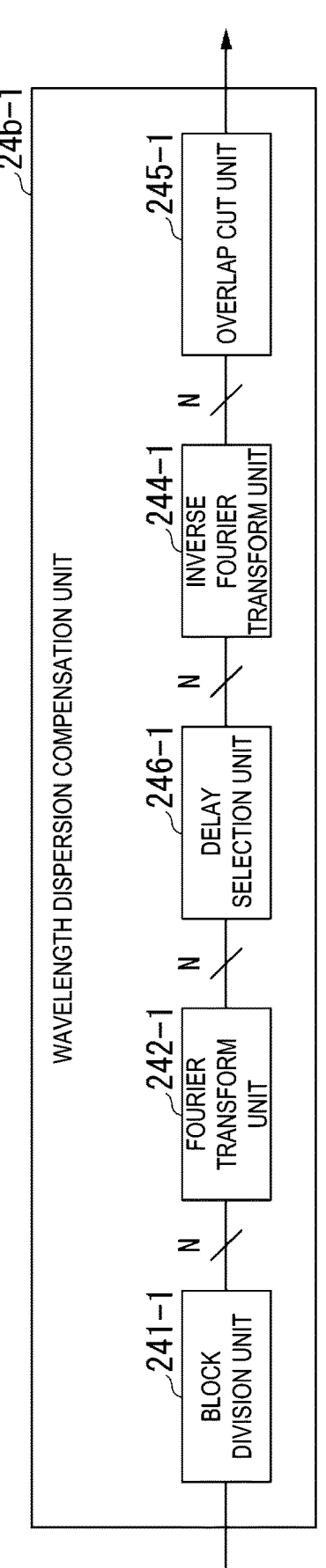
FIG. 15 is a block diagram illustrating a configuration of a wavelength dispersion compensation unit according to a third embodiment.

FIG. 15 is a block diagram illustrating a configuration of a wavelength dispersion compensation unit $24b$-1 according to the third embodiment. The wavelength dispersion compensation units $24b$-1 to $24b$-O have the same configuration. Thus, the wavelength dispersion compensation unit $24b$-1 will be described as an example. The wavelength dispersion compensation unit $24b$-1 includes a block division unit 241-1, a Fourier transform unit 242-1, an inverse Fourier transform unit 244-1, an overlap cut unit 245-1, and a delay selection unit 246-1.

The delay selection unit 246-1 selects an output in accordance with each bin of a frequency domain signal output by the Fourier transform unit 242-1.

Figure 16:
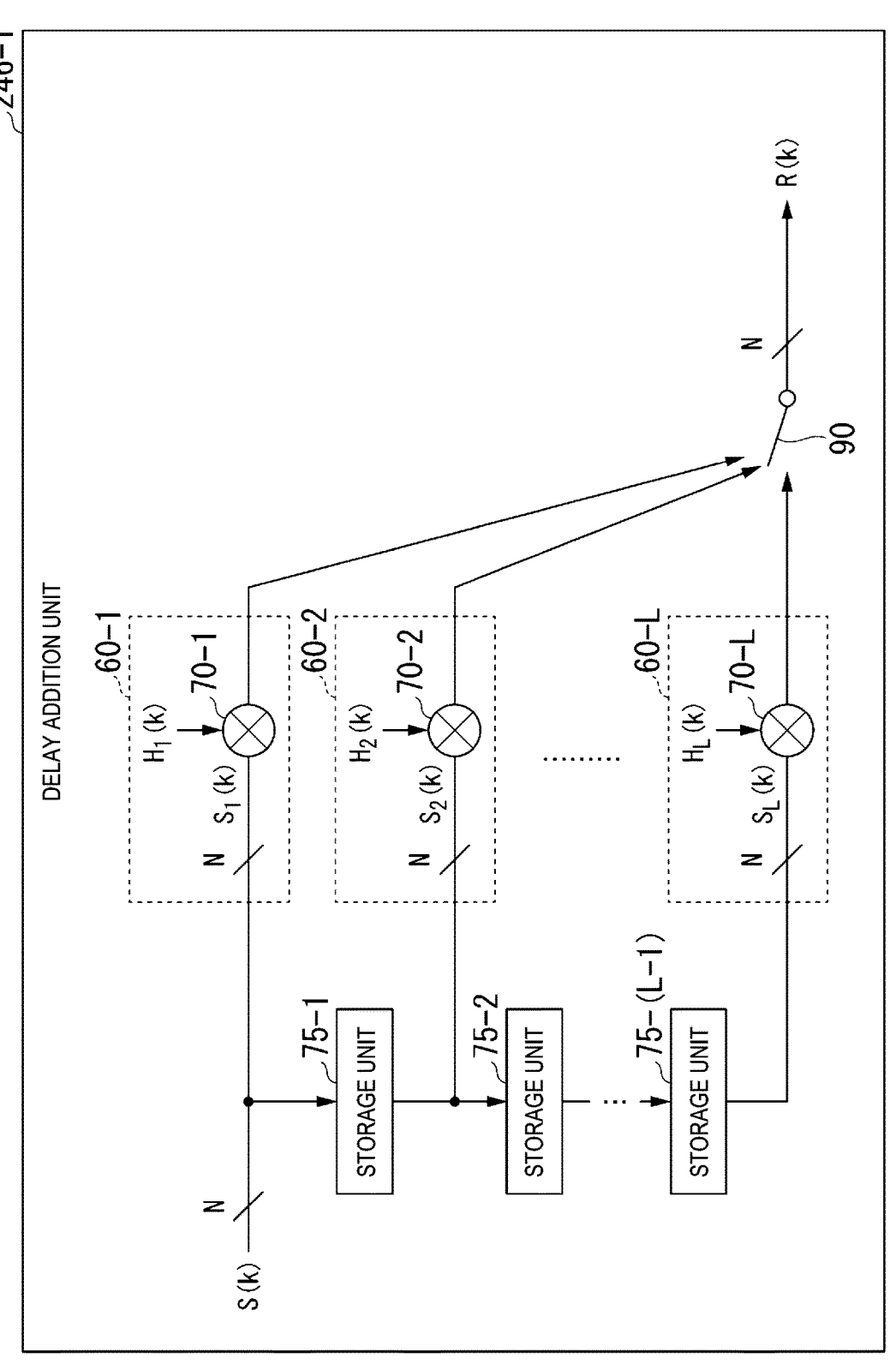
FIG. 16 is a block diagram illustrating a configuration of a delay selection unit according to the third embodiment.

FIG. 16 is a block diagram illustrating a configuration of the delay selection unit 246-1 according to the third embodiment. As illustrated in FIG. 16, the delay selection unit 246-1 includes storage units 75-1 to 75-(L−1), multiplier arrays 70-1 to 70-L, and a selection unit 90. The delay selection unit 246-1 has a configuration similar to that of the delay addition unit 243-1 other than that a selection unit 90 is included instead of the adder 80 in the delay addition unit 243-1. Hereinafter, only the selection unit 90 will be described.

The selection unit 90 selects an output of any one stage for each bin. For example, the selection unit 90 selects an output of any one stage for each bin, and for example, selects the first stage (stage level 60-1) for zeroth bin to 15th bin and selects the second stage (stage level 60-2) for 16th bin to 31st bin. The delay selection unit 246-1 multiplies a predetermined coefficient in the stage level selected by the selection unit 90 from among the stage levels 60-1 to 60-L. In a case in which the selection unit 90 selects the stage level 60-1, for example, a block $S_1(k)$ output by the Fourier transform unit 42-1 is multiplied by a coefficient $H_1(k)$. Then, the stage levels 60-2 to 60-L that have not been selected by the selection unit 90 is not multiplied by the coefficient. In this manner, it is possible to omit multiplication for the signals that have not been selected by the selection unit 90 in the case of the delay selection scheme. This reduces the amount of calculation as compared with the delay addition scheme. Here, the blocks multiplied by the coefficient in the stage levels selected by the selection unit 90 correspond to the coefficient-applied blocks.

The optical reception apparatus 2 in the third embodiment configured as described above can perform dispersion compensation with low power consumption even in a scheme different from those in the first and second embodiments. Specifically, the optical reception apparatus 2 in the third embodiment is different from those in the first and second embodiments only in the method of performing the wavelength dispersion compensation and is the same in that the dispersion compensation is performed for each subcarrier. This reduces a circuit scale needed for the dispersion compensation.

Moreover, dispersion compensation can be performed with low power consumption in the coherent optical transmission using the subcarrier modulation.

Modification Example of Third Embodiment

The optical reception apparatus 2 according to the third embodiment may be modified similarly to the first embodiment. For example, the optical reception apparatus 2 according to the third embodiment may be configured to perform delay compensation in the previous stage of the error correction unit 27. For example, the optical reception apparatus 2 according to the third embodiment may be configured to include the adaptive equalization unit 25 and the frequency/phase compensation unit 26 in the previous stage of the delay compensation units 28-1 to 28-O and include the adaptive equalization unit 30 and the frequency/phase compensation unit 31 in the later stage of the delay compensation units 28-1 to 28-O as illustrated in FIG. 11.

The optical reception apparatus 2 according to the third embodiment may be configured such that the subcarrier division unit 23 and the plurality of wavelength dispersion compensation units $24b$-1 to $24b$-O are integrated similarly to the second embodiment. In the case of such a configuration, it is only necessary for the optical reception apparatus 2 according to the third embodiment to include a plurality of delay selection units 246-1 to 246-O instead of the plurality of delay addition units $243a$-1 to $243a$-O in the optical reception apparatus $2a$.

Moreover, a part of the processing performed by the optical reception apparatuses 2 and $2a$ in the aforementioned embodiments (for example, the processing performed by the coefficient multiplication unit 233, the delay addition unit 243*a*, and the delay selection unit 246) may be achieved by a computer. In that case, the functions may be implemented by recording a program for implementing the functions in a computer readable recording medium and causing a computer system to read and execute the program recorded in the recording medium. Note that the "computer system" described here is assumed to include an OS and hardware such as a peripheral device.

The "computer-readable recording medium" means a portable medium such as a flexible disk, a magneto-optical disk, a ROM, or a CD-ROM or a storage device such as a hard disk incorporated in the computer system. Moreover, the "computer-readable recording medium" may include a recording medium that dynamically holds the program for a short period of time, such as a communication line in a case in which the program is transmitted via a network such as the Internet or a communication line such as a telephone line, or a recording medium that holds the program for a specific period of time, such as a volatile memory inside a computer system that serves as a server or a client in that case. Furthermore, the aforementioned program may be for implementing some of the aforementioned functions, or may be able to implement the aforementioned functions in combination with a program that has already been recorded in the computer system, or using a programmable logic device such as a field programmable gate array (FPGA).

Although the embodiment of the present disclosure has been described in detail with reference to the drawings, a specific configuration is not limited to the embodiment, and a design or the like in a range that does not depart from the gist of the present disclosure is included.

INDUSTRIAL APPLICABILITY

The present disclosure can be applied to a coherent optical transmission system employing a subcarrier modulation scheme.

REFERENCE SIGNS LIST

1 Optical transmission apparatus
2*a* Optical reception apparatus
21 Coherent detecting unit
22 Analog-to-digital conversion unit
23 Subcarrier division unit
24-1 to 24-O Wavelength dispersion compensation unit
25, 30 Adaptive equalization unit
26, 31 Frequency/phase compensation unit 26
27-1 to 27-O Error correction unit
28-1 to 28-O Delay compensation unit
29 Multiplexer
231 Block division unit
232 Fourier transform unit
233 Coefficient multiplication unit
234 Distribution unit
235-1 to 235-O Inverse Fourier transform unit
236-1 to 236-O Overlap cut unit
241-1 to 241-O Block division unit
242-1 to 242-O Fourier transform unit
243-1 to 243-O Delay addition unit
244-1 to 244-O Inverse Fourier transform unit
245-1 to 245-O Overlap cut unit

The invention claimed is:

1. An optical reception apparatus comprising:
at least one wavelength dispersion compensation unit configured to perform wavelength dispersion compensation for each subcarrier contained in a reception signal obtained by interfering a received optical signal and a local light emission; and
a plurality of delay compensation units configured to compensate for a delay between reception signals at different subcarriers among the reception signals at subcarriers obtained by the wavelength dispersion compensation, wherein
the at least one wavelength dispersion compensation unit comprises a plurality of wavelength dispersion compensation units, and
each of the plurality of wavelength dispersion compensation units delimits a reception signal of the reception signals input into blocks each having a specific length such that an overlapping portion having a predetermined length between adjacent blocks is generated, outputs the blocks delimited, performs a Fourier transform for each of the blocks, holds the blocks that are temporally consecutive after the Fourier transform, applies a coefficients defined according to a wavelength dispersion compensation amount in accordance with a frequency position and a delay amount in accordance with the frequency position and a time position to each of the blocks held, generates a coefficients applied block by adding up a coefficients applied frequency component value for each frequency position, performs an inverse Fourier transform on the coefficient-applied block generated, and removes the overlapping portion from the coefficient-applied block after the inverse Fourier transform,
wherein the coefficients are a different value for each time position and are different for each frequency position.

2. The optical reception apparatus according to claim 1 further comprising:
one or more adaptive equalization units configured to compensate for distortion generated in a waveform of an optical signal in an optical transmission path;
one or more frequency/phase compensation units configured to compensate for a frequency offset and a phase offset for a signal on which the adaptive equalization processing has been executed by the one or more adaptive equalization units; and
one or more error correction units configured to perform error correction on an input signal, wherein
the plurality of delay compensation units are provided in any of a later stage of one or more error correction units, a position between the at least one wavelength dispersion compensation unit and the one or more adaptive equalization units, a position between the one or more frequency/phase compensation units and the one or more error correction units, and a position between combinations of the one or more adaptive equalization units and the one or more frequency/phase compensation units, the combinations being provided before and after the plurality of delay compensation units.

3. The optical reception apparatus according to claim 1, wherein
each of the plurality of wavelength dispersion compensation units calculates the coefficients aforementioned coefficient based on the following Equation (1), $$H_l(k) = B_l(\omega) \times \exp(j/2\beta_2\omega^2 - jl\beta_1\omega) \tag{1}$$

In equation (1), l=1 to L, Bl ($\omega$) is a window function, $\beta 2$ is a wavelength dispersion parameter, w is expressed by equation (2), and $\beta_1$ is expressed by equation (3), $$\omega = 2\pi\Delta f(k-1) \tag{2}$$

$$\beta_1 = \Delta t \times N(M-1)/M \tag{3}.$$

4. An optical reception method comprising:

performing wavelength dispersion compensation for each subcarrier contained in a reception signal obtained by interfering a received optical signal and a local light emission; and compensating for a delay between reception signals at different subcarriers among the reception signals at subcarriers obtained by the wavelength dispersion compensation, delimiting, by each of the plurality of wavelength dispersion compensation units, a reception signal of the reception signals input into blocks each having a specific length such that an overlapping portion having a predetermined length between adjacent blocks is generated, outputting, by each of the plurality of wavelength dispersion compensation units, the blocks delimited, performing, by each of the plurality of wavelength dispersion compensation units, a Fourier transform for each of the blocks, holding, by each of the plurality of wavelength dispersion compensation units, the blocks that are temporally consecutive after the Fourier transform, applying, by each of the plurality of wavelength dispersion compensation units, coefficients defined according to a wavelength dispersion compensation amount in accordance with a frequency position and a delay amount in accordance with the frequency position and a time position to each of the blocks held, generating, by each of the plurality of wavelength dispersion compensation units, a coefficients applied block by adding up a coefficients applied frequency component value for each frequency position, performing, by each of the plurality of wavelength dispersion compensation units, an inverse Fourier transform on the coefficient-applied block generated, and removing, by each of the plurality of wavelength dispersion compensation units, the overlapping portion from the coefficient-applied block after the inverse Fourier transform, wherein the coefficients are a different value for each time position and are different for each frequency position.

\* \* \* \* \*